UNITED STATES PATENT OFFICE.

JOHN M. McCANDLESS, OF ATLANTA, AND JOSEPH F. ALLISON, OF CALHOUN, GEORGIA.

FERTILIZER COMPOUND.

SPECIFICATION forming part of Letters Patent No. 539,747, dated May 21, 1895.

Application filed December 22, 1894. Serial No. 532,734. (Specimens.)

*To all whom it may concern:*

Be it known that we, JOHN M. MCCANDLESS, of Atlanta, in the county of Fulton, and JOSEPH F. ALLISON, of Calhoun, in the county of Gordon, State of Georgia, citizens of the United States of America, have made a certain new and useful Fertilizer Compound; and we do hereby declare the following to be a full, clear, and exact specification of the compound, as required by law.

The object of the invention is to provide a drier for the compound which will absorb the moisture of whatever kind therein and at the same time give to the mixture a fine appearance and marketable color, and also reduce a high phosphate. To this end the mixture consists of the usual phosphatic, nitrogenous, ammoniate and alkaline ingredients duly prepared, with the addition of a sufficient quantity of pulverulent graphitic schist, which may be ground as finely as desired.

The ingredients are usually mixed in about the following proportions to the ton of product: superphosphate, twelve hundred pounds; dried blood, one hundred pounds; cotton-seed meal, two hundred and fifty pounds; muriate of potash, fifty pounds; ground graphitic schist, four hundred pounds. These ingredients provide the required fertilizer compound as hereinbefore named, and the addition of the graphitic schist in its granular or pulverulent condition forms a drier by absorption, lends a rich black color, not shiny, adds a little ammoniates and alkaline matter, and dilutes the high grade phosphate.

Having thus described our invention, what we claim as new, and desire to secure by Letters Patent of the United States, is—

A fertilizer compound consisting of an acid-phosphate, dried blood, cotton-seed meal, muriate potassa, and ground graphitic schist, in about the proportions specified.

In testimony whereof we hereunto set our hands this 26th day of October, 1894.

JNO. M. McCANDLESS.
JOS. F. ALLISON.

Witnesses:
A. P. WOOD,
HARDIE L. KEITH.